Oct. 3, 1939.　　　　　E. H. TAYLOR　　　　　2,174,903
SELECTIVE TRANSMISSION FOR MOTOR CARS
Filed Aug. 6, 1935　　　3 Sheets-Sheet 1
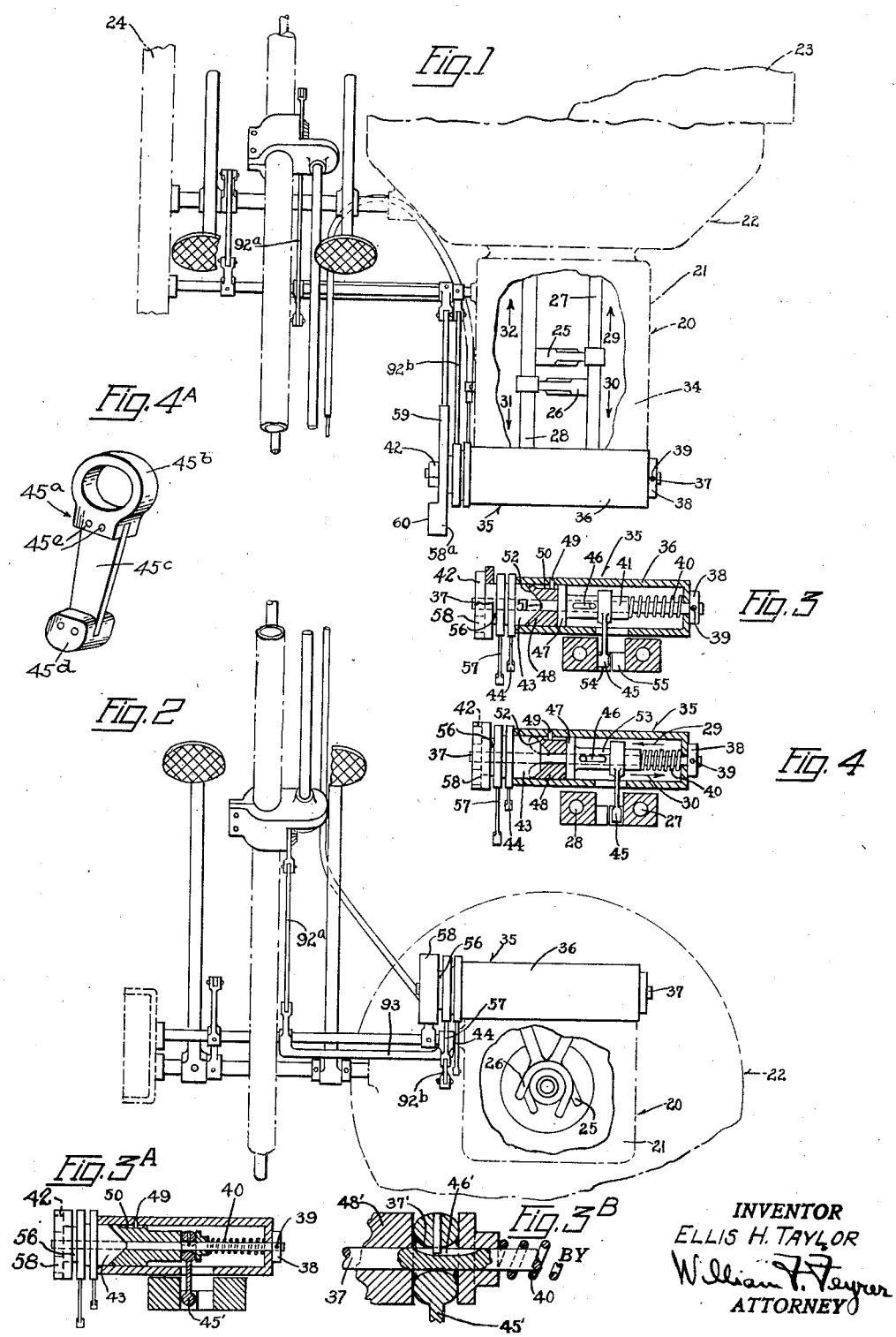
INVENTOR
ELLIS H. TAYLOR
BY William F. Weyres
ATTORNEY

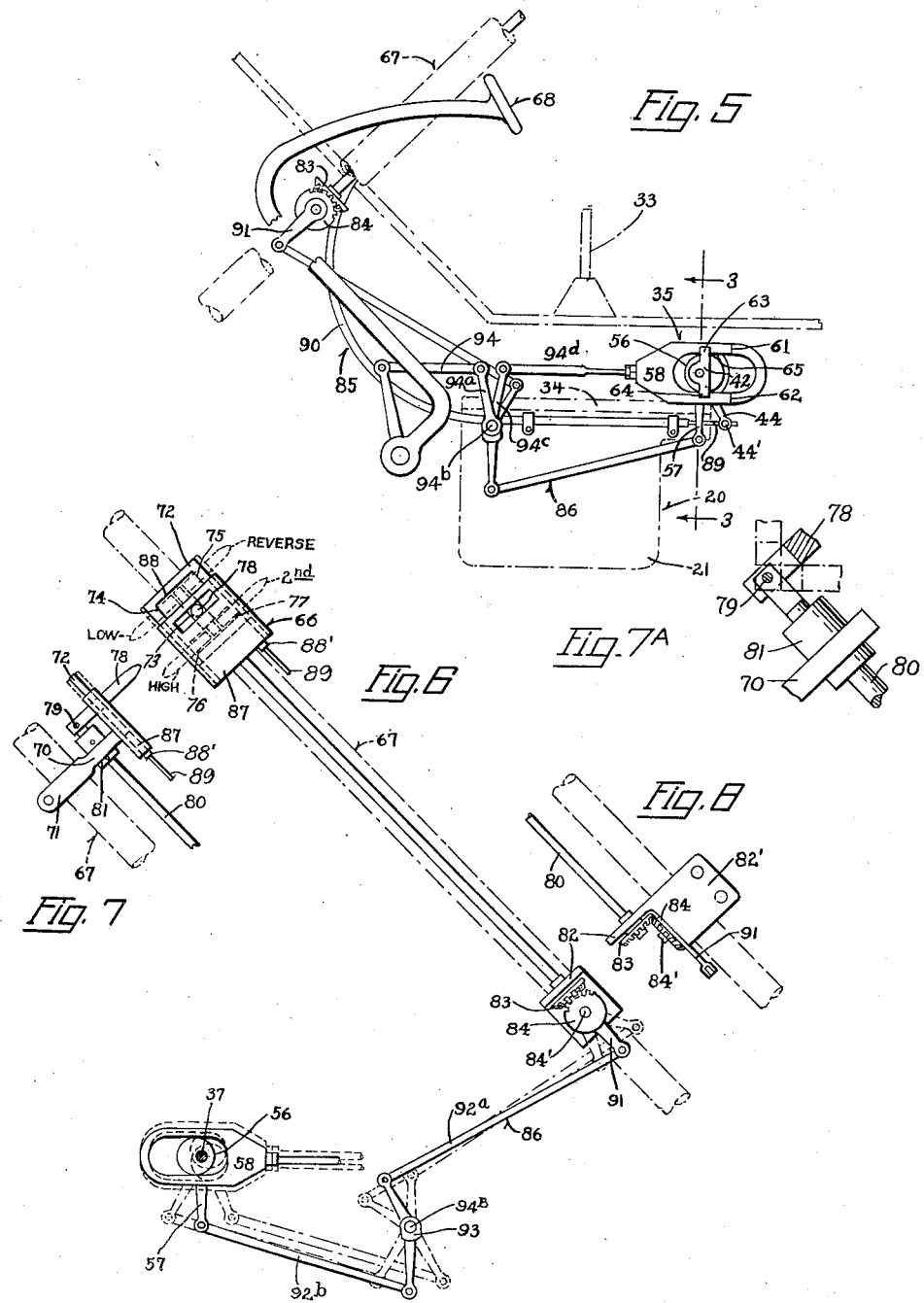

Oct. 3, 1939.  E. H. TAYLOR  2,174,903
SELECTIVE TRANSMISSION FOR MOTOR CARS
Filed Aug. 6, 1935   3 Sheets-Sheet 3
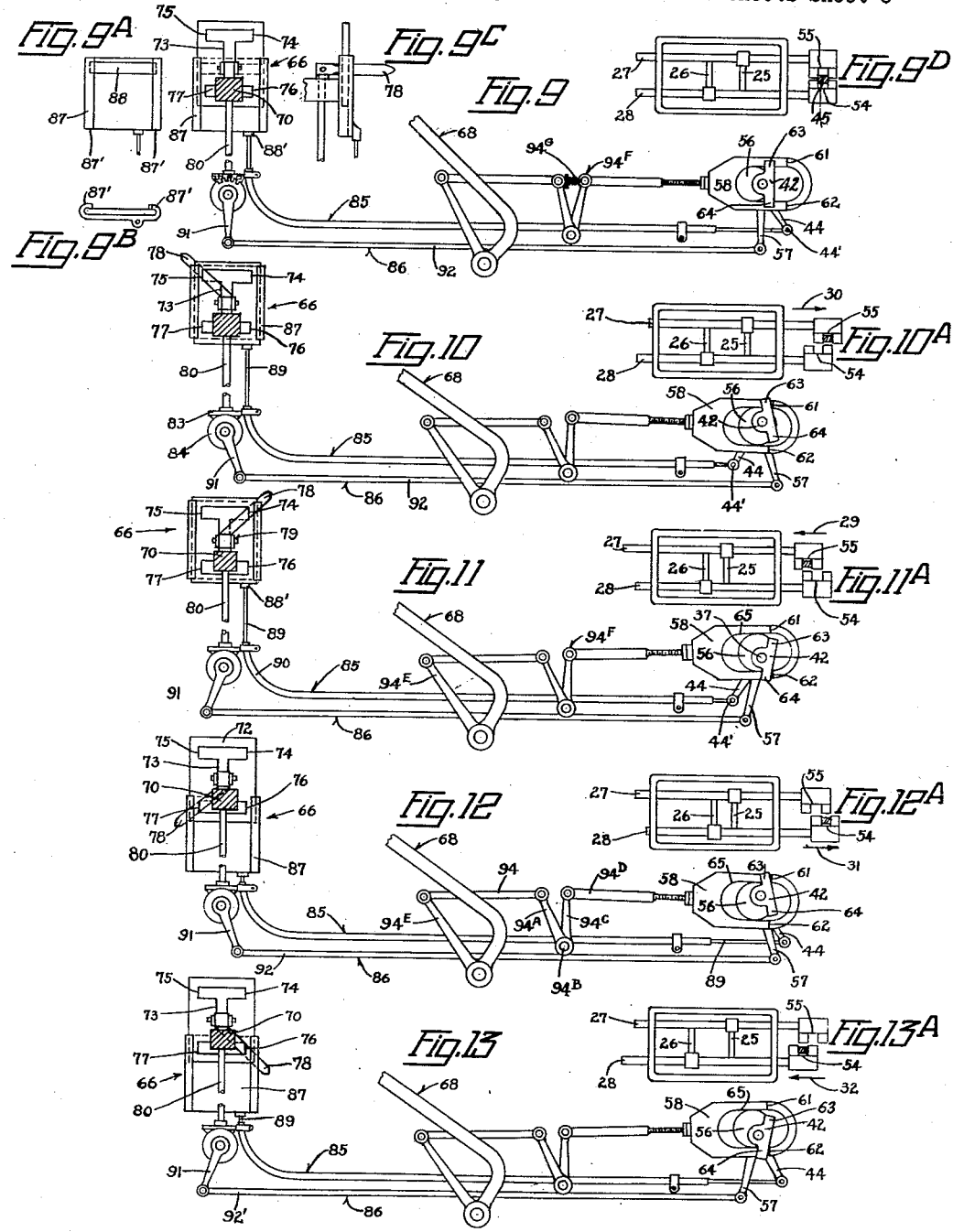
INVENTOR
ELLIS H. TAYLOR
BY
William T. Ferrar
ATTORNEY Patented Oct. 3, 1939

2,174,903

UNITED STATES PATENT OFFICE 2,174,903

SELECTIVE TRANSMISSION FOR MOTOR CARS

Ellis H. Taylor, East Norwalk, Conn.

Application August 6, 1935, Serial No. 34,947

15 Claims. (Cl. 74—334)

This invention relates to selective transmissions, primarily of the type used in motor cars for transmitting power from the motor to the driving wheels, through different gears in order to vary the speed of the car and the ratio of R. P. M. between the motor and the wheels. In particular it relates to sliding gear transmissions of the automatic type adapted to dispense with the usual manually operated shift lever which projects upwardly from a point near the floor board, interferes with occupants, and which necessitate close attentive manipulation thereof simultaneously with the operation of the clutch.

There have been a number of previous efforts to provide automatic or semi-automatic transmissions, but nearly all of these efforts resulted in very large, cumbersome, and costly devices, some of which, in the one device, included mechanical, electrical, and pneumatic controlling mechanisms. Consequently, most of these devices got out of order easily and were therefore impositive in their operation or were far too costly to warrant manufacture.

It is a most important object of the present invention to provide an automatic transmission which will be extremely simple in its mode of operation, and with a minimum number of moving parts, so that initial assembly and adjustments may be effected with ease, and so that subsequent repairs and adjustments can be made without difficulty.

In meeting this object, the present invention broadly provides two main shifting members comprising a very novel escapement member and cooperating pallet adapted to work together in a positive and efficient manner.

It is another very important object of the present invention to provide an automatic transmission in which no electrical controlling mechanisms, with attendant possibility of current failure and corroded contacts, are required, and one in which no pneumatic controlling mechanisms, with attendant possibility of leakage and failure are required.

A feature resulting from attaining this object is the provision of an automatic transmission which is fully mechanical and not electrical or pneumatic in its mode of operation.

It is an important further object of the present invention to provide a highly efficient automatic transmission which may be used with present day design of transmission cases so that manufacturers need not change very expensive fixtures, tools, and machinery which are now producing silent and satisfactory gears and associated parts, and an automatic shifting mechanism which may if desired be added to old cars and selective transmissions which have been in use, even for a number of years back if desired.

To this end the present invention provides a simple main shifting mechanism which may be assembled to the top of existing transmission cases and associated selector mechanism which may be assembled upon the regular steering column of cars, all without difficulty.

Other objects, features, and advantages will be described hereinafter, or will be apparent.

In the drawings, which are merely illustrative of the present preferred form of the invention:

Figure 1 is a top plan view of the automatic transmission, not including the selector mechanism.

Fig. 2 is a rear view of the automatic transmission shown in Fig. 1.

Fig. 3 is a sectional view taken on line 3—3 in Fig. 5, with the parts in third or high speed position.

Fig. 3A is a fragmentary detail view of a modified form of shifting sub unit.

Fig. 3B is an enlarged sectional view of one section of the mechanism shown in Fig. 3A.

Fig. 4 is a sectional view, similar to Fig. 3, but shows the parts in first or low speed position.

Fig. 4A is an enlarged detail view of the resilient control finger provided by the present invention.

Fig. 5 is a side view of the parts shown in Figs. 1 and 2.

Fig. 6 is a detailed view of the preparing mechanism.

Fig. 7 is a fragmentary detail and side view of a portion of the mechanism shown in Fig. 6.

Fig. 7A is an enlarged and fragmentary view of the selector lever.

Fig. 8 is a fragmentary detail of the lower section of the mechanism shown in Fig. 6.

Fig. 9 is a schematic showing of the complete mechanism of the present invention in a neutral position.

Fig. 9A is a rear view of the shifting plate.

Fig. 9B is a top view of the shifting plate.

Fig. 9C is a side view of the shifting plate and its most closely associated parts.

Fig. 9D is a top view of the transmission case, with the shifting rods in neutral position.

Fig. 11 is a schematic view similar to Fig. 9 but shows the parts in "first" or "low" speed.

Fig. 11A is a top view similar to Fig. 9D, but shows the shifting rods in first or low speed position.

Fig. 10 is a schematic view, like Fig. 9 and Fig. 11, but shows the parts in the reversing condition.

Fig. 10A, like Fig. 9D, shows the top of the transmission case, but differs by showing the shifting rods in the reversing condition.

Fig. 12 schematically shows the parts in second or intermediate speed condition.

Fig. 12A schematically shows certain of the transmission case parts in second or intermediate condition.

Fig. 13 schematically shows the parts in third or high speed condition.

Fig. 13A shows the transmission case parts in the third or high condition.

Fig. 14 merely shows the shifting mechanism substantially in the center of the transmission case.

Fig. 15 is a fragmentary detail of a modified form of escapement plate.

Referring now in detail to the drawings, the present preferred form of the invention is shown as applied to the usual form of sliding gear transmission 20, including a housing 21 secured directly to a clutch housing 22 of a power plant 23, such as a usual internal combustion engine, all being mounted upon a chassis 24 in any of the now well known ways. The housing supports a plurality of gears in such manner that they may be shifted relative to each other and to a primary or driving gear as by shift yokes 25 and 26 on sliding rods 27 and 28 respectively. The gears inside the housing thereof may be any one of the several now very well known types, a detailed showing thereof in the present instance might only confuse the showing of the novel parts of the present mechanism, and showing thereof has therefore been omitted.

Suffice to state that in the present form the yoke 25 and rod 27 shift the associated gears into first and reverse when shifted in the direction of the arrows 29 and 30 (see Fig. 1) and the yoke 26 and rod 28 shift the associated gears into second and third when moved in the direction of the arrows 31 and 32 respectively. Ordinarily this shifting is accomplished with a long lever and by manually shifting the rods 27 and 28, and the yokes 25 and 26 by direct hand manipulation of a lever 33 shown by dot and dash lines in Fig. 5. Therefore, it is necessary for the operator to obtain a critical relationship between the speed the motor is operating and speed the wheels are turning in order to be able to mesh gears, and to do this without clashing gears. An entirely different mechanism and mode of control, obviating these difficulties, is provided by the present invention.

In place of the usual cover and hand shifting lever 33 on top of the housing 21 the present invention provides a plate 34 (see Fig. 5) supporting a novel shifting mechanism 35 including a casing 36 transversely supporting a control rod 37 for rocking or limited oscillatory movement. A collar 38 held in place by a pin 39 prevents the control rod 37 from shifting to the left, as viewed in Fig. 3, and a spring 40 normally urging a collar 41 and other parts on the control rod 37 toward an escapement plate 42, prevents the control rod 37 from adversely moving to the right.

The left end of the control rod 37 is supported centrally in the casing 36 by a male cam member 43 which has a finger 44 projecting downwardly therefrom. A finger 45 having a pin and slot connection 46 is also supported on the control rod 37 for movement to the left and right as shown in Figs. 3 and 4 respectively, and, as by a flange 47, urges and maintains a female cam member 48 in operative engagement with the male cam member 43, said female member being mounted for axial movement in the casing but held against rotative or arcuate movement therein as by a pin 49 and spline slot 50.

The male cam member 43 is provided with a pointed surface 51 similar to the outside of a V, and the female cam member 48 is provided with a hollowed surface 52 similar to the inside of a V. When the finger 44 is moved forwardly from the position shown in Fig. 3 to the position shown in Fig. 4, the pointed surface 51 works against the surface 52 and pushes a sleeve 53 and the finger 45 from the left hand position, in operative engagement with a notch 54 in the sliding rod 28 to the right hand position in operative engagement with a notch 55 in the sliding rod 27.

Between the male cam member 43 and the escapement plate 42, the control rod 37 pivotally supports an eccentric 56 having an associated finger 57, the latter having a neutral position shown in Fig. 9, a front position shown in Figs. 11 and 13, and a rear position shown in Figs. 10 and 12.

Mounted upon the eccentric 56, between a flange section thereof and the escapement plate 42, is a pallet plate 58, having a thin section 59 and a thick section 60 (see Fig. 1) with an integral upper pallet 61 and lower pallet 62, cooperating with upper and lower fingers 63 and 64 respectively on the escapement plate 42. An elongated slot 65 in the pallet plate 58 allows the eccentric 56 to be rocked or moved arcuately therein, and allows relative movement between it and the escapement plate 42, as when the pallets 61 and 62 thereon pull against the fingers 63 and 64.

Thus, the shifting mechanism 35 may move the finger 45 and associated yokes 25 and 26 into a neutral position, and into any one of four working positions, the preparation thereof being accomplished by a selector 66 preferably mounted on a regular steering column 67 just below the steering wheel, and actuated by the regular operation of the clutch pedal or control 68 on the clutch mechanism 22 of the motor car.

The selector 66, shown in Figs. 6 through 13 inclusive, and best understood by referring to Figs. 6 through 9, includes a stationary bracket 70 affixed to the steering column 67 as by a clamp 71 adapted to support a substantially integral master plate 72 having a substantially vertical aperture 73 with interconnecting upper notches 74 and 75 and lower notches 76 and 77.

A selector lever 78 is mounted for four-way movement in the slot 73 and notches just described, as by a pin and slot connection 79 permitting substantially vertical movement thereof and a rod 80 in a bearing 81 permitting substantially horizontal movements. The rod 80 preferably extends toward the bottom of the steering column 67 to be rotatably mounted in a bearing 82. A bevel gear 83 affixed to the lower end thereof and meshing with a bevel gear or segment 84 rotatably mounted upon a stud 84' in the bracket 82' serves to oscillate an interconnected finger 91 as the rod 80 is moved in opposite directions, to the various positions shown in Fig. 6.

This selector 66, through driving trains 85 and 86 is adapted to condition the cam member 43 and the eccentric 56 respectively. In its present preferred form, the driving train 85 includes a plate 87 having edges 87' curled around the master plate 72 to confine it for vertical movement, while a slot 88 therein permits shifting the lever horizontally relative thereto. The plate is, through a wire 89, connected directly to the finger 44 of the cam member 43. This connection is preferably effected by a socket 88' to the plate 87 and a pivot 44' to the finger 44. A tube 90 may be provided to prevent the wire 89 from kinking or foreshortening in any way.

The other driving train 86 now preferably includes the rod 80 supported in the manner hereinbefore described, and through bevel gears or segments 83 and 84 imparts coordinate movements to a finger 91. The latter, through a rod 92 and direct connection to the finger 57, as shown in Figs. 9 through 13 (or by rod 92a, yoke 93, and rod 92b to finger 57) imparts clockwise and counter-clockwise movement to the finger 57, to oscillate the eccentric 56, and thereby raises or lowers the pallet plate 58 relative to the fingers 63 and 64 of the escapement plate 42.

Back and forth movement of the pallet plate 58 on the eccentric 56 is accomplished by the clutch pedal 68 through a link 94 extending to a finger 94a secured to the rod 94b and another finger 94c thereon pulling an interconnected link 94d secured to the pallet plate.

The eccentric 56 has the high section thereof to the rear of the control rod 37 in the neutral position with that form of the invention shown in Figs. 1 through 8, when a direction changing lever 93 is used, and located to the front thereof when a direct connection 86 thereto is employed, as shown in Figs. 9 through 13 inclusive.

Operation

Normally the transmission 20 is in a neutral position in which even the selector lever 78 is in the central position relative to the master plate 72 as shown in Figs. 6, 7, and 9, and whereupon the male eccentric 56 and escapement plate 63 are respectively in the positions shown in Figs. 6 and 9. Also, in the neutral position, the finger 45, yokes 25 and 26, and sliding rods 27 and 28 are in the position shown in Fig. 9D.

When it is desired to have the motor drive the car in first speed, the operator, without first depressing the clutch pedal 68 in the usual way, merely moves the lever 78 upwardly and rearwardly into the notch 74 whereupon the plate 87 is pushed up by the slot 88 and lever 78 and concurrently pulls the wire 89 to pull the finger 44 of the cam member 43 into the position shown in Figures 4 and 11 and to push the finger 45 fully into the notch 55 of the sliding rod 27, as shown in Fig. 11A.

The point of the male cam 43 as it moves toward a vertical position pushes the female cam 48 and finger 45 toward the right as viewed in Fig. 4. Concurrently, the lever 78, through the driving train 86 moves the finger 57 forwardly and the associated eccentric 56 into an up position shown in Fig. 11 so that the lower pallet 62 aligns with the lower finger 64, and so that the upper pallet 61 and upper finger 63 clear each other.

Thus, the transmission is prepared for a shifting of the gears in the housing 21 but the shifting thereof has not been effected, and consequently it is not necessary to keep the clutch pedal 68 depressed with resultant wear on the clutch collar if there is a momentary delay before actually starting or moving the car.

Conditioning of the gears within the housing is effected automatically by the clutch pedal 68 and incidentally to the depressing thereof, for when the parts are prepared as just described and the clutch pedal is depressed, the lower pallet 62 imparts a clockwise movement to the finger 64. In this movement the control rod 37 and finger 45 are rocked into the position shown in Fig. 11A to move the sliding rod 27 forwardly in the direction of the arrow 29, and through the interconnected yoke 25 to move the usual gears into first or low speed.

When the lever 78 of the selector 66 is moved to the neutral position shown in Figs. 6 and 9, the eccentric 56 is moved to the central position shown in Fig. 9 whereupon the upper and lower fingers 63 and 64 align with the upper and lower pallets 61 and 62 respectively so that they rock the control rod 37, associated finger 45, sliding rods 27 and 28, and associated gears back into the neutral position when the pallet plate 58 is moved ahead by depressing the clutch pedal 68. Any usual pin and slot connection 94F with a spring 94G may be provided (as shown in Fig. 9) to allow further depression of the clutch pedal 68 after both pallets align with both fingers, if desired.

Second speed is accomplished by moving the selector lever 78 into the lower and forward notch 77 and by depressing and letting up the clutch pedal 68. As the lever is moved to this position, the connection 85 moves the point of the male cam 43 into a substantially horizontal plane whereby the female cam 48 and finger 45, under the influence of the spring 49, move to the farthest left position to enter the notch 54 of the sliding rod 28 entirely clear of the notch 55 in the sliding rod 27, and simultaneously the driving connection 86 moves the eccentric 56 and pallet plate 58 into the raised position (see Fig. 12) to align the upper pallet 61 and upper finger 63.

When the clutch pedal is subsequently depressed the pallet plate 58 is moved forwardly to concurrently impart counter-clockwise movement to the control rod 37 and finger 45, thereby moving the sliding rod 28 rearwardly in the direction of the arrow 31 to the position shown in Fig. 12A so that the yoke 26 thereon moves the well known gears in the housing into second speed condition. When the clutch pedal is let up or is no longer depressed, the motor 23 and clutch mechanism 22, through the so prepared transmission, drives the car in second speed.

Third, or high speed is effected similarly, by moving the selector lever 78 into the bottom and back position shown in Fig. 13, and by depressing and letting up on the clutch pedal 68. When the lever is moved to this position, the connection 86 moves the eccentric 56 and pallet plate 58 into the raised position so that the lower pallet 62 aligns with the lower finger 64 to rock the control rod 37 and the lower finger 64 and pallet clear of each other. The lever 78 in this lowered position also, through the connection 85 including the slot 88 and plate 87, moves the point of the male cam member 43 into a substantially horizontal plane so that the female cam member takes the farthest left hand position shown in Fig. 3 allowing the finger 45 to align with the notch 54 of the sliding rod 28.

When the clutch pedal 68 is thereafter depressed, the lower pallet 62 engages the lower finger 64 and moves the same in a clockwise direction, thereby moving the interconnected finger 45 forwardly as shown in Fig. 13. The latter, through the notch 54, moves the sliding rod 28 and yoke 26 thereon forwardly in the direction of the arrow 32 (see Fig. 13A) so that the usual interconnected gears are moved into third or high speed condition and are so driven when the clutch pedal is raised.

Reverse speed is accomplished by moving the selector lever 78 into the top forward notch 75 of the master plate 72 as shown in Fig. 10, and by depressing and letting up on the clutch pedal 68. When the lever is moved to this position the connection 85, through the plate 87 and wire 89 moves the point of the cam 43 into its most vertical position, shown in Fig. 4, thereby moving the female cam 48 and finger 45 to the farthest right hand position fully into the notch 55 of the sliding rod 27 and fully out of the notch 54 of the rod 28. Concurrently, the connection 86 moves the eccentric 56 and pallet plate 58 into the lowered position shown in Fig. 10 so that the upper pallet 61 and lower finger 63 align, and the lower finger 64 and lower pallet 62 clear each other.

Thereafter, when the clutch pedal 68 is depressed, the upper pallet 61 engages and moves the upper finger 63 into the counter-clockwise position, and through the control rod 37 and finger 45 moves the associated sliding rod 27 and yoke 25 rearwardly in the direction of the arrow 30, as shown in Figs. 10 and 10A, so that the usual gears will be driven in a reverse or car backing condition when the clutch pedal is raised to connect the transmission and motor.

Preferably, the finger 45, between the hub section thereof which engages the control rod 37, and the lower end which engages the notches 54 and 55 is made resilient, as by being relatively thin and wide in cross-section so that it yields sidewise but not lengthwise when it must do the real work of shifting the rods 27 and 28. Such a yielding control finger 45a is shown in detail in Fig. 4A wherein the hub section 45b is provided with a strip 45c of tempered spring steel and has a button 45d at its lower end, such strip preferably being set and held in suitable slots as by rivets 45e. With this it is possible to move the finger 45 from the rod 28 toward the rod 27 even though the notch 55 is not aligned to completely prepare the mechanism for a shifting into reverse or first.

Thus, due to the yielding nature of the control finger it may be moved longitudinally of the control rod even though the notches are not in alignment, and when the notches are adjusted in substantial alignment the control finger will automatically span from one position to another. Similarly, as shown in Figs. 3A and 3B, a finger 45' may be provided with an arcuate bore 37' and pin and slot connection 46' whereby it will tilt slightly against the pressure of the spring 40 to snap into the notch 54 or 55 when the clutch pedal is later depressed.

From the foregoing it will be appreciated that the transmission can be preselected for shifting from second directly to third speed gear and vice versa, and also for shifting from reverse directly to first speed gear and vice versa without first neutralizing the transmission. Also, when shifting from first speed gear to second speed gear or vice versa, and when shifting from reverse to third speed gear or vice versa, it is not necessary to first specially neutralize the transmission as the control finger will automatically snap over to engage the notch in one sliding rod when the notch in the other sliding rod comes into alignment therewith. However, when it is desired to shift from first to third speed gear or vice versa, and when it is desired to shift from reverse to second speed gear or vice versa it is necessary to first neutralize the transmission so that the notches 54 and 55 will be brought into alignment.

Fig. 14 merely illustrates the notches 54' and 55', similar to notches 54 and 55 on the rods 27 and 28 respectively, within, rather than outside the housing 21 in which event the shifting mechanism 35 and casing 36 will be located substantially in the center of the housing. Such location of the casing 36 and finger 45 on the control rod 37 makes it possible to use this mechanism on old cars and selective transmissions which are now in use and have been for many years.

Fig. 15 shows a slightly modified and preferred form of escapement plate 42' wherein fingers 63' and 64' are each provided with a slight bevel 63a and 64a respectively, to facilitate and make smoother shifting from one working position to another as the escapement plate is operated by the pallet plate 58.

Variations and modifications may be made within the scope of this invention, and portions of the improvements may be used without others.

Having thus described the present preferred forms of the invention, what is claimed as new is:

1. In a selective transmission mechanism the combination of a housing enclosing gears; a selector; sliding rods for shifting the gears in the housing; a clutch pedal; a casing on said housing; a control rod in said casing; a finger on said control rod for selectively cooperating with said sliding rods; a cam adapted to shift said finger axially on the control rod in said casing to selectively cooperate with said sliding rods; an escapement plate; an eccentric associated with said control rod; a pallet plate associated with said eccentric and movable to selected positions thereby; means connecting said selector with said cam and eccentric; and other means connecting said clutch pedal to said pallet plate to rock said control rod and finger and to move a selected sliding rod in a selected direction when the clutch pedal is operated.

2. In a selective transmission mechanism the combination of a housing enclosing gears; a selector; sliding rods for shifting the gears in the housing; a clutch pedal; a casing on said housing; a control rod in said casing; a finger on said control rod cooperating with said sliding rods; means for shifting said control finger axially of said control rod in said casing to selectively cooperate with said sliding rods; an escapement plate having a pair of fingers; a pallet plate having a plurality of pallets, for rocking said control rod; a driving connection between said selector and said means for moving said first named finger into various positions axially in said casing; means for selectively aligning certain fingers on the escapement plate with pallets on the pallet plate for rocking the control rod and associated finger in opposite directions; and means connecting said clutch pedal to the pallet plate to operate the latter and said sliding rods.

3. In a selective transmission mechanism the combination of a housing enclosing gears; a selector; sliding rods for shifting the gears in the housing; a clutch pedal; a casing on said housing; a control rod in said casing; a finger on said control rod cooperating with said sliding rods; means for shifting said control finger axially of the control rod in said casing to selectively cooperate with said sliding rods; an escapement plate; an upper finger on said escapement plate; a lower finger; a pallet plate; an upper pallet; a lower pallet; a driving connection between said selector and said means for moving the first named finger into various positions axially in said casing; means for selectively and alternately aligning the upper pallet with the upper finger and the lower pallet with the lower finger for rocking the control rod and associated finger in opposite direction; and means connecting the clutch pedal with the pallet plate for rocking the control rod and finger and moving a selected sliding rod when the clutch pedal is operated.

4. In a selective transmission mechanism the combination of a housing enclosing the usual reverse, low, second and high speed gears; sliding rods for shifting the gears in the housing; a clutch pedal; means including a rockable control finger movable transversely of said sliding rods for selectively moving the latter into various positions; means located remotely from the housing adapted to prepare said first named means for travel to various positions; a mechanical operating connection between the clutch pedal and the first named means; and escapement means associated with the operating connection for conditioning the gears only on the first movement of the clutch pedal and necessitating movement of the first means again before the clutch pedal is again effective to shift gears.

5. In a selective transmission mechanism the combination of a housing enclosing the usual reverse, low, second and high speed gears; sliding rods for shifting the gears in the housing; a clutch pedal; means including a rockable control finger movable transversely of said sliding rods for selectively moving the latter into various positions; means including only direct mechanical connections located remotely from and extending to the housing adapted to prepare and to positively operate said first named means; and escapement means associated with the operating connection for conditioning the gears only on the first movement of the clutch pedal and necessitating movement of the first means again before the clutch pedal is again effective to shift gears.

6. In a selective transmission mechanism the combination of a housing enclosing gears; sliding rods for shifting the gears in the housing; a clutch pedal; means including a rockable control finger movable transversely of said sliding rods for selectively moving the latter into various positions; a master plate having a plurality of stations; a sliding plate on the master plate; a selector lever movable into various stations in the master plate; means extending from said selector lever and sliding plate to the first named means adapted to prepare the first named means to move the sliding rods to predetermined positions; and an operating connection between the clutch pedal and the first named means for moving a selected sliding rod when the clutch pedal is operated.

7. In a selective transmission mechanism the combination of a housing enclosing gears; a selector; sliding rods for shifting the gears in the housing; a clutch pedal; a casing on said housing; a control rod in said casing; a finger on said control rod for selectively cooperating with said sliding rods; camming mechanism on said control rod in said casing for shifting said finger axially of the control rod; a pin and slot connection between said control rod and the finger thereon; yielding means for urging said finger toward the camming mechanism; an eccentric, rockable on the control rod; an escapement plate secured to the rod; a pallet plate with an elongated aperture accommodating said eccentric; a selector mechanism adapted to operate the camming mechanism and the eccentric and to thereby prepare the finger associated with the sliding rods; and a driving connection between said clutch pedal and said pallet plate to operate said control finger and move a selected sliding rod.

8. In a selective transmission mechanism the combination of a housing enclosing gears; sliding rods for shifting the gears in the housing; a clutch pedal; means including a rockable control finger movable transversely of said sliding rods for selectively moving the latter into various positions; a master plate having a plurality of stations; a sliding plate on the master plate; a selector lever movable into the various stations on the master plate and adapted to move the sliding plate; a connection between said selector lever and the first named means; only one wire connecting said sliding plate to the first named means, said connection and wire being adapted to predeterminedly prepare said means when the selector lever is moved to various stations; and an operating connection between said clutch pedal and said first named means for moving a selected sliding rod when the clutch pedal is operated.

9. In a selective transmission mechanism the combination of a housing enclosing gears; sliding rods for shifting the gears in the housing; a clutch pedal; means including a rockable control finger movable transversely of said sliding rods for selectively moving the latter into various positions; a master plate having a plurality of stations; a sliding plate on the master plate; a selector lever movable into the various stations on the master plate and adapted to move the sliding plate; a connection between said selector lever and the first named means including an oscillatable shaft; only one wire connecting said sliding plate to the first named means, said connection and wire being adapted to predeterminedly prepare said means when the selector lever is moved to various stations; and an operating connection between said clutch pedal and said first named means for moving a selected sliding rod when the clutch pedal is operated.

10. In a selective transmission mechanism the combination of a housing enclosing gears; a selector; sliding rods for shifting the gears in the housing; a clutch pedal; a casing on said housing; a rockable control rod in said casing; a finger on said control rod for selectively cooperating with said sliding rods; a cam on said rod adapted to shift said finger on said control rod axially in the casing; an escapement plate affixed to the control rod; an eccentric on the control rod; a pallet plate for rocking said control rod in selected directions having an elongated slot accommodating said eccentric; means connecting said selector with said cam to shift said finger and with said eccentric to shift said pallet plate; and other means connecting said clutch pedal to said pallet plate to rock said control rod and finger and to move a selected sliding rod in a selected direction when the clutch pedal is operated.

11. In a selective transmission mechanism the combination of a housing enclosing gears; a selector; a clutch pedal; sliding rods for shifting the gears in the housing and having notches therein; a casing on the housing; a control rod rockable in the casing; a finger on the control rod, rockable therewith and axially movable thereon, and in this movement adapted to engage with the notches in the sliding rods to move the same to predetermined positions; means associated with the selector for preparing the control rod and finger to shift the sliding rods; and an escapement mechanism associated with the clutch pedal, for shifting the sliding rods when the clutch pedal is operated.

12. In a selective transmission mechanism the combination of a housing enclosing gears; means for shifting the gears within the housing; a casing on the housing; a rockable control rod in said casing associated with said means; a control finger movable axially of said rod; a selector; a clutch pedal; means associated with the selector for preparing said finger control; an escapement plate having fingers thereon a driving connection between said selector and the escapement plate; a pallet plate having pallets thereon engaging said fingers on the escapement plate; and a connection between the clutch pedal and pallet plate said last-named connection and the first-named driving connection conditioning said means within the housing for shifting the gears.

13. In a selective transmission mechanism the combination of a housing enclosing gears; means for shifting the gears within the housing; a casing on the housing; a rockable control rod in said casing associated with said means; a control finger movable axially of said rod; a selector; a clutch pedal; a pallet plate on the control rod having a thin section; an integral thick section on the pallet plate forming pallets; an escapement plate; fingers on the escapement plate overlying the thin section of the pallet plate and alignable with the thick section forming the pallets; means associated with the selector for perparing said control rod and the finger thereon; and an operating connection between the clutch pedal and the pallet plate for operating the control rod and conditioning the means associated therewith in the housing when the clutch pedal is operated.

14. In a selective transmission mechanism the combination of a housing enclosing gears; a selector; sliding rods for shifting the gears in the housing; a clutch pedal; a casing on said housing; a control rod in said casing; a finger movable axially on said control rod for selectively cooperating with said sliding rods; means for rocking and for moving the control finger axially in said casing, to selectively move the sliding rods into various positions; and means allowing said finger to tilt relative to the control rod.

15. In a selective transmission mechanism the combination of a housing enclosing gears; a selector; sliding rods for shifting the gears in the housing; a clutch pedal; a casing on said housing; a control rod in said casing; a resilient finger movable axially on said control rod for selectively cooperating with said sliding rods; and means for rocking and for moving the control finger axially in said casing, to selectively move the sliding rods into various positions.

ELLIS H. TAYLOR.